March 8, 1938.        C. W. GANNETT        2,110,126
WHEEL
Filed Oct. 15, 1934

INVENTOR.
Chauncey W. Gannett.
Slough and Canfield
ATTORNEY.

Patented Mar. 8, 1938

2,110,126

UNITED STATES PATENT OFFICE 2,110,126

WHEEL

Chauncey W. Gannett, Wellington, Ohio, assignor to Wellington Machine Company, Wellington, Ohio, a corporation of Ohio Application October 15, 1934, Serial No. 748,361

6 Claims. (Cl. 301—63)

This invention relates to wheels and particularly to wheels of the class adapted to be used on industrial trucks and the like, such for example as wheels having a central bearing rotatable on a fixed axle.

Among the objects of the invention are:

To provide generally an improved wheel of the class referred to;

To provide, in a wheel of the class referred to, improved means for securing a rim of the wheel to a central wheel structure;

To provide a wheel of the class described having an improved bearing construction;

To provide a wheel of the class referred to having a removable tire supporting rim and constructed and assembled in a manner to facilitate removal of the tire for renewal purposes;

To provide a wheel of the class referred to in which a rim is secured to the central wheel portion by outwardly radially exerted thrust, and having improved means for exerting said radial thrust.

Other objects will be apparent to those skilled in the art to which my invention appertains.

My invention is fully disclosed in the following description taken in connection with the accompanying drawing, in which.

The subject matter of this application is a continuation in part of the subject matter as disclosed in Patent No. 1,980,479, for Improvements in wheels, issued November 13, 1934, and Pat. No. 2,007,444 for Improvements in wheels issued July 9, 1935 and reference may be had thereto for subject matter illustrated and described in the instant application but not claimed herein.

Figures 1, 3, 4:
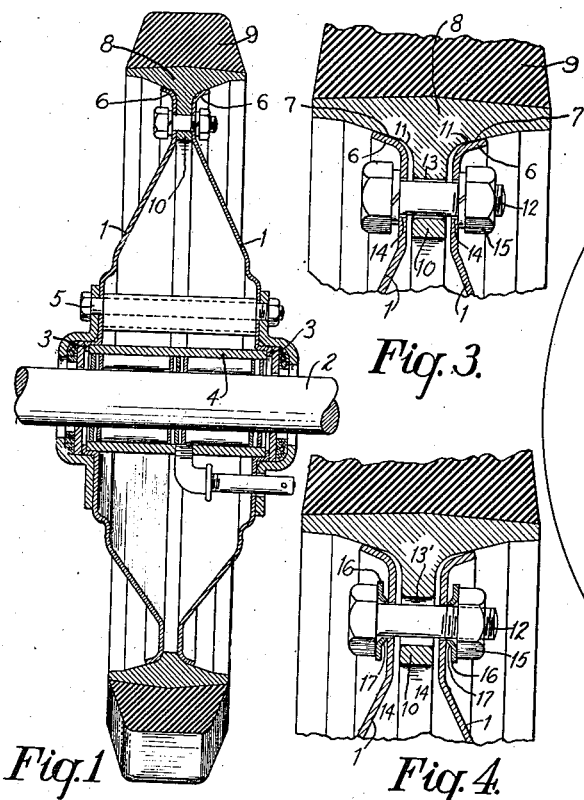
Fig. 1 is a cross-sectional view of a wheel embodying my invention in one form.
Fig. 3 is a view to a larger scale of a part of Fig. 1 illustrating a step of assembling the wheel.
Figs. 4 and 5 are views generally similar to Fig. 3, illustrating a modification.
Figure 2:
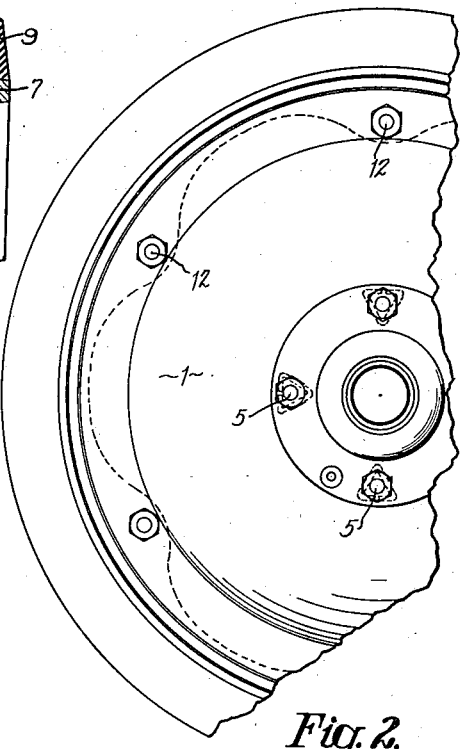
Fig. 2 is a fragmentary side elevational view of the wheel of Fig. 1.

Referring to the embodiment of my invention illustrated in Figs. 1, 2 and 3, I have illustrated at 1—1 a pair of axially dished discs centrally perforated to receive an axle 2 therethrough and having inwardly radially extending flanges 3—3 clamped upon opposite ends of a tubular hub or bearing element 4 by bolts 5 disposed to draw generally central portions of the discs 1—1 inwardly axially toward each other, to effect a rigid hub structure and bearing enclosure at the wheel center. The details of construction of the wheel center thus briefly described and more completely illustrated in the drawing is not an essential part of the instant invention but is a part of the subject matter of the above mentioned copending application Serial No. 601,246.

The peripheries of the discs 1—1 are bent outwardly axially providing flanges 6—6 having radially outwardly thereof generally frusto-conical faces 7—7, the cone angle of which will be more fully described.

At 8 is indicated a wheel rim, substantially rigid and which may be suitably formed from cast metal. A tire 9 of cushioning material may be mounted on the rim in any suitable manner. The rim 8 has an inwardly radially extending rib or tongue 10 and laterally thereof as viewed in Fig. 3 is provided with frusto-conical surfaces 11—11.

In general, the disc flanges 6—6 are disposed on opposite sides of the tongue 10 and the frusto-conical faces 7 thereof engage the frusto-conical surfaces 11. Bolts 12—12 are projected through aligned perforations 13 in the rib 10 and 14 in the discs, and the nuts 15 when drawn up on the bolts 12 effect a clamping action on the discs to draw them toward each other to effect a wedging engagement of the surfaces 11 and faces 6. The material of the discs 1 and flanges 6 is preferably resilient such as resilient sheet metal, and when the bolts 12 have drawn the discs into rigid engagement with the sides of the tongue 10 as illustrated in Fig. 1, the wedging engagement referred to exerts an outward radial resilient thrust between the discs and the rim to secure them together for transmission of load from the rim to the center of the wheel or to an axle 2 therein without liability of becoming loose and affording a substantially rigid structure from the hub to the rim.

In the use of wheels of this type, when the tire 9 has worn or broken, it becomes desirable to change it by removing as a unit the rim and the tire thereon. It then is necessary to remove the discs 1—1. I have found that if the angular inclination, as viewed in Fig. 3, of the rim surfaces 11—11 is too small, that is to say, makes too small an angle with the wheel axis, it is very difficult to remove the discs 1—1 because the resilient flanges 6 when wedged therewith become locked therewith, and in the effort to unlock them the flanges 6 or the discs 1 may be mutilated. On the other hand, if the angular inclination is too great, the flanges 6 resist being wedgingly drawn thereover and may be permanently bent or distorted when the same is attempted by drawing up the bolts 12. Again, if the angular inclination of the surfaces 11 is suitably provided, then the corresponding angular inclination of the faces 7—7 must likewise be suitably predetermined. If the angle is too great, the entire bending stress on the flanges 6 may be applied thereto at the outer peripheral edge and may bend or distort them during the drawing up of the bolts 12. And if the angular inclination of the faces 7 is too small, the outer peripheral edges of the flanges 6 may not engage the surfaces 11 when the discs are drawn up by the bolts.

By making repeated tests, I have found that if the angular inclination of the surfaces 11 is not less than seven degrees, a suitable wedging action may be effected without undue liability that the discs will lock when it is desired to remove them; and that a suitable amount of bending of the flanges 6 will result if the inward axial divergence of the faces 7 and surfaces 11 is not less than one degree and not more than 5 degrees.

If these limits are adhered to, the outer peripheral edges of the flanges 6 will, when the discs are drawn up by the bolts, engage the surfaces 11 of the rim and at the same time when the bolts 12 are loosened, the discs will be readily removable.

In the modification of Fig. 4, the discs 1—1 are locked to the tongue 10. To this end, the perforation 13' in the tongue 10 is enlarged with respect to the bolts 12, and washers 16—16 having inwardly projecting beads 17—17 formed at the inner periphery thereof are placed on the bolts. When the nuts 15 are drawn up on the bolts, the beads 17 will press into the perforation 13' the portions of the discs adjacent the periphery of their perforations 14—14 as shown in Fig. 5 thus interlocking the discs with the tongue 10 to insure that the discs and rim may not be displaced circumferentially after they have once been secured in position.

Figures 5, 6, 8:
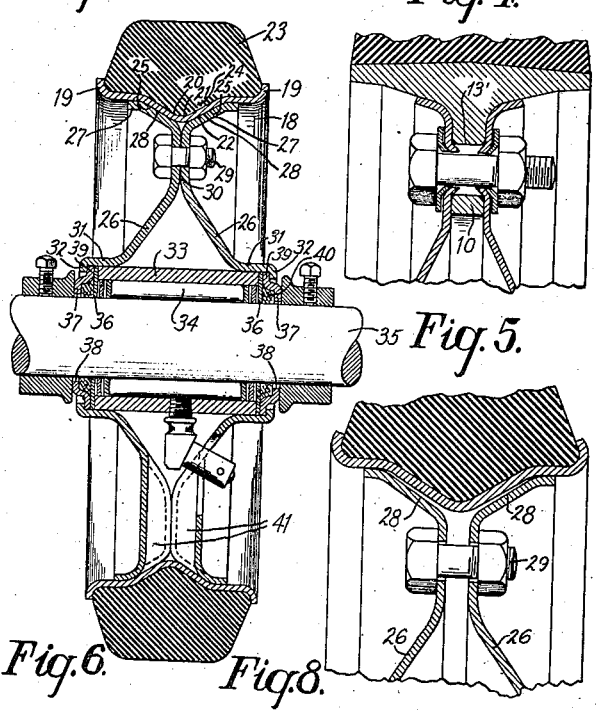
Fig. 6 is a cross-sectional view illustrating another form of wheel embodying my invention.
Fig. 8 is a view to a larger scale of a part of Fig. 6 illustrating a step in the process of assembling the wheel.
Figure 7:
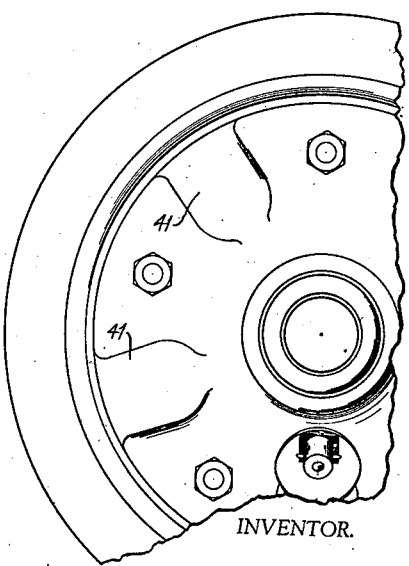
Fig. 7 is a fragmentary side elevational view of the wheel of Fig. 6.

In the form of Figs. 6, 7 and 8 I have shown a rim 18 formed from sheet metal. As well understood in the art, a sheet metal rim may be rolled from lengths of sheet metal and the ends abutted and welded together. Any suitable method may be utilized to form the rim 18. In cross-section, the rim 18 is generally of channel form. The lateral flanges 19—19 are rounded. The web is depressed as at 20 thus providing an outwardly concave recess 21 and an inner bead 22. A tire of rubber or like cushioning material 23 is formed to fit in the channel rim substantially filling it, the recess 21 into which the tire fits cooperating with the flanges 19 to retain the tire in the rim. Such tires may be vulcanized directly to the rim 18. In such vulcanizing processes, the tire is compressed between axially approaching die elements and heretofore it has been found that when the pressure of the die elements is applied to the rubber of the tire, it in some instances tends to separate from the rim along the medial line thereof and to form a weak portion or in some cases a cavity in the tire adjacent the rim. By providing the recess 21, a bead 24 of the tire may extend from the body of the tire inwardly radially to fill the recess, and the liability above mentioned of producing defective rims is obviated completely.

On the radially inner side of the channel web, it is provided with inclined surfaces 25—25 substantially frusto-conical with respect to the wheel axis and oppositely inclined. A pair of discs 26—26 are formed with peripheral, axially extending flanges 27—27 having formed thereon opposite inclined faces 28—28, (see also Fig. 8), generally frusto-conical with respect to the wheel axle. The inclination of the faces 28 relative to the surfaces 25 is such as to provide an angle therebetween of not less than one degree for the reason given above. The discs 26 may be drawn toward each other by bolts 29 to effect a wedging action between the faces 28 and 25, and as shown in Fig. 6 the discs may be drawn entirely together as at 30 in which position the flanges 27 will engage the rim with a wedging action exerting outward resilient thrust to secure the rim with the tire thereon to the discs.

The discs 26 are dished and have central tubular hub portions 31—31 thereon terminating outwardly axially in inwardly radially directed flanges 32—32. A tubular bearing element 33 is telescoped into the tubular portions 31 when the discs are assembled as illustrated. Suitable roller or like bearing elements 34 may be disposed in the bearing element 33 to support an axle 35. Washers 36—36 are disposed at the end of the tubular element 33. Hub elements 37—37 are provided generally of cup form with perforations 38—38 in the bottoms of the cups embracing the axle 35 and with outwardly radially extending flanges 39—39 thereof disposed between the washers 36 and the terminal flanges 32.

The parts thus just described are so provided that upon tightening up the bolts 29, the terminal flanges 32—32 will clamp the hub elements 37 and washers 36 upon the ends of the bearing element 33 to provide a rigid hub construction. The tubular portion 31 may be cylindrical and have telescopic fit with the outer wall of the tubular element 33 and the outer peripheries of the washers 36 and flanges 39 may fit the inner wall of the tubular portion 31 whereby to align the inner peripheries of the washers 36 and hub elements 37 with the axle 35 with a relatively close fit therein. Packing material 40 may be disposed between the washers 36 and the bottoms of the cup-form hub elements 37.

The discs 26 may have angularly spaced ribs 41—41 pressed therein for stiffness. It will be observed that the depressed portion 20 of the channel-form rib serves three purposes, interiorly providing an expansion recess into which the rubber of the tire 23 may move upon being vulcanized under pressure to prevent outward radial movement thereof forming defects as known in the practice, and the recess also provides for a tongue-and-groove interlock connection between the tire and the rim; and radially inwardly, the depressed portion 20 provides the rib for wedging engagement with the peripheral portions of the discs to secure the rim to the discs.

In the foregoing description, numerous embodiments by which my invention may be practiced are described and various other forms and modifications will occur to those skilled in the art, and my invention comprehends all such forms and modifications coming within the scope of the appended claims.

I claim:

1. In a wheel, a rim, a central hub supporting structure comprising axially opposite sheet metal discs having circularly perforated portions adjacent the rim, a radially inwardly extending rim tongue disposed between the said disc perforated portions and having enlarged perforations in alignment with the disc perforations, a bolt having a shank in each set of aligned perforations, a nut and a head on the shank one outwardly of one disc and the other outwardly of the other, a washer device between the head and one disc and a like washer device between the nut and the other disc, said washer devices having inwardly elevated annular portions surrounding the bolt shank and the bolt head and nut being adapted to draw the sheet metal portions toward each other to clamp them upon the rim tongue and to cause the elevated annular portions of the washer devices to inwardly draw and deform the sheet metal discs adjacent the peripheries of their perforations into the enlarged perforations of the tongue, to interlock the discs with the rim tongue.

2. In a wheel, a continuous rigid rim formed with radially inwardly disposed axially opposite inwardly converging frusto-conical annular disc seats disposed symmetrically with respect to a rotational plane therebetween, and having an included angle of not substantially greater than 166°, a pair of like sheet metal dished wheel discs provided with frustro-conical annular resilient flanges having an included angle of not substantially greater than 164°, engaged with the said seats respectively, by detachable attaching means arranged to forcibly draw the disc flanges rigidly into the seats by yieldably bending the resilient flanges, and thereby exerting an outwardly radial wedging action of the discs upon the rim to connect the rim to the discs, and whereby the discs may be readily detached from the rim upon relieving the attaching means.

3. A wheel as described in claim 2 and in which means is provided to rigidly stop the discs at the end of the drawing of the disc flanges into the disc seats.

4. A wheel as described in claim 2 and in which the rim has an inwardly radially extending tongue and the discs, inwardly of the resilient flanges are clamped upon opposite sides of the tongue by the attaching means upon drawing the yieldable flanges into the disc seats.

5. A wheel as described in claim 2 and in which the discs inwardly of the yieldable flanges are clamped upon each other by the attaching means upon drawing the yieldable flanges into the disc seats.

6. A wheel as described in claim 2 and in which the rim is formed of sheet metal and the disc seats are on the inner surface of an inwardly convex outwardly concave bead on the rim, and a rubber tire is mounted on the rim and has a tongue seated in the convexity of the bead.

CHAUNCEY W. GANNETT.